(12) United States Patent
Chan et al.

(10) Patent No.: US 8,179,889 B2
(45) Date of Patent: May 15, 2012

(54) SIP SERVLET APPLICATIONS CO-HOSTING

(75) Inventors: Phillip Chan, Newport (GB); Gilles Compienne, Cardiff (GB); Ian Evans, Cardiff (GB); Gethin Liddell, Cardiff (GB); Owen Williams, Cardiff (GB)

(73) Assignee: Avaya Inc., Basking Ridge, NJ (US)

( * ) Notice: Subject to any disclaimer, the term of this patent is extended or adjusted under 35 U.S.C. 154(b) by 335 days.

(21) Appl. No.: 12/495,372

(22) Filed: Jun. 30, 2009

(65) Prior Publication Data

US 2010/0329239 A1 Dec. 30, 2010

(51) Int. Cl.
*H04L 12/28* (2006.01)
(52) U.S. Cl. .............. 370/389; 370/352; 370/395.21; 714/3; 714/16; 714/38; 714/47
(58) Field of Classification Search .............. 370/352, 370/389, 395.21; 714/3, 15, 16, 25, 38, 47
See application file for complete search history.

(56) References Cited

U.S. PATENT DOCUMENTS

| | | | | |
|---|---|---|---|---|
| 7,028,311 | B2 * | 4/2006 | Roach et al. | 719/328 |
| 7,661,027 | B2 * | 2/2010 | Langen et al. | 714/15 |
| 7,668,839 | B2 * | 2/2010 | Otokawa et al. | 707/999.01 |
| 7,895,475 | B2 * | 2/2011 | Kulkarni et al. | 714/25 |
| 8,001,250 | B2 * | 8/2011 | Langen et al. | 709/227 |
| 2003/0028669 | A1 * | 2/2003 | Batsleer et al. | 709/240 |
| 2005/0240654 | A1 | 10/2005 | Wolber et al. | |
| 2006/0239247 | A1 * | 10/2006 | Postmus | 370/352 |
| 2007/0280226 | A1 * | 12/2007 | Sonalkar et al. | 370/389 |
| 2008/0158336 | A1 * | 7/2008 | Benson et al. | 348/14.08 |
| 2008/0313615 | A1 * | 12/2008 | Cai et al. | 717/121 |
| 2009/0175279 | A1 * | 7/2009 | Gao et al. | 370/395.21 |
| 2009/0187919 | A1 * | 7/2009 | Maes | 719/313 |
| 2009/0300155 | A1 * | 12/2009 | Ivanov et al. | 709/223 |

FOREIGN PATENT DOCUMENTS

WO WO 2004/077269 9/2004

OTHER PUBLICATIONS

Kulkarni et al., "SIP Servlet Specification, version 1.1.", JSR 289 Exper Group, Oracle Corporation, Aug. 1, 2008, 242 pages.
Bessis, "Improving Performance and Reliability of an IMS Network by Co-Locating IMS Servers," Bell Labs Technical Journal, Jan. 2006, vol. 4, No. 10, pp. 167-178.
Carlin et al., "A SIP Application Router for Presence-Driven Composition of IMS Services," IEEE, The Second International Conference on Next Generation Mobile Applications, Services, and Technologies, 2008, pp. 207-212.

(Continued)

*Primary Examiner* — Ayaz Sheikh
*Assistant Examiner* — Andrew C Lee
(74) *Attorney, Agent, or Firm* — Sheridan Ross P.C.

(57) ABSTRACT

Methods, devices, and systems are provided for allowing a single machine, such as a server, to co-host multi-SIP Archive (SAR) applications offering SIP servlet based products. The concept of a Root Application Router is introduced that is adapted to coordinate other Sub-Application Routers rather than individual SARs. These other Sub-Application Routers are fully fledged Application Routers in their own right, but are unaware of the controlling Root Application Router.

11 Claims, 3 Drawing Sheets

OTHER PUBLICATIONS

"3rd Generation Partnership Project; Technical Specification Group Services and Systems Aspects; Network Architecture (Release 6)," Global Systems for Mobile Communications, 3GPP TS 23.002, V6.2.0, 2003, pp. 1-53.

Cheung et al., "An Application Router for SIP Servlet Application Composition," IEEE, ICC 2008 Proceedings, pp. 1802-1806.

Dinsing et al., "Service Composition in IMS Using Java EE SIP Servlet Containers," Ericsson Review, 2007, no. 3, pp. 92-96.

Ren et al., "SIP Application Composition Framework Based on Business Rules," IEEE, Network Operations and Management Symposium, 2008, pp. 823-826.

Extended European Search Report for European Patent Application No. 10158396.1, dated Jun. 15, 2010.

\* cited by examiner

SIP SERVLET APPLICATIONS CO-HOSTING

FIELD OF THE INVENTION

The invention relates generally to communications and more specifically to SIP applications.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant (PDA), or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

The concept of an Application Router has been introduced with the Java Specification Request (JSR) 289 specification, the entire contents of which are hereby incorporated herein by reference. An Application Router is responsible for application composition. Within this context, application composition is the process of "chaining" multiple applications together into a logical sequence. When multiple applications are chained together, an application will process a given SIP message and once it is done with the needed processing, the application passes the SIP message to the next application in the chain.

Examples of SIP applications which may be included in an application composition include a presence application, a contact resolution application, a call setup application, a blacklist application, a voicemail application, and any other application which provides some sort of feature within the SIP architecture. As one example of an application composition, an incoming SIP message may first be filtered by a blacklist application before being passed to a normal call setup application, and then may be passed to a voicemail application after N rings.

JSR 289 states that it is the role of the developer to define the application composition by providing an Application Router implementation. An application in this sense refers to a single SIP Archive (SAR) or SAR file, where the SAR file contains one or more servlets. However, in reality, an application often comprises several SAR files and several servlets (this is then known as a multi-SAR application). Each SAR file represents a wrapper of some feature of the application. The developers often include a specialized Application Router implementation that is only capable of coordinating its own SAR files. Servlets may also be contained in a Web Archive (WAR) or WAR file.

JSR 289 does not define how a SIP Servlet Container should manage multiple Application Routers and, therefore, there is currently no mechanism for reliably deploying more than one multi-SAR application on the same SIP Servlet Container. This means that the application server is only able to deploy extremely limited applications, which is inefficient and counter to the main reason for using a SIP application server. As can be appreciated by one skilled in the art, this is highly inconvenient and a waste of resources since the server often has enough processing and/or memory resources to support more than one multi-SAR Application. In fact, it is analogous to using a web server such as WAS or Weblogic to only serve one set of pages or applications, instead of being able to host many websites and services simultaneously.

Consider, for example, two complex applications, each consisting of multiple SARs, which are deployed to a SIP Application Server. A first application might be a PBX type application, and a second application might be a call routing application. Due to the complexities of the call routing application it is necessary to write a custom application router for each application. These logical applications and associated application routers were developed separately but now there is a desire to host them on the same Application Server. The prior art solution to this problem is constrained to only being able to deploy a single custom application router. It will, therefore, be necessary to rewrite/merge the two application routers into a single application router. Such a process is time consuming and difficult.

Figure 1:
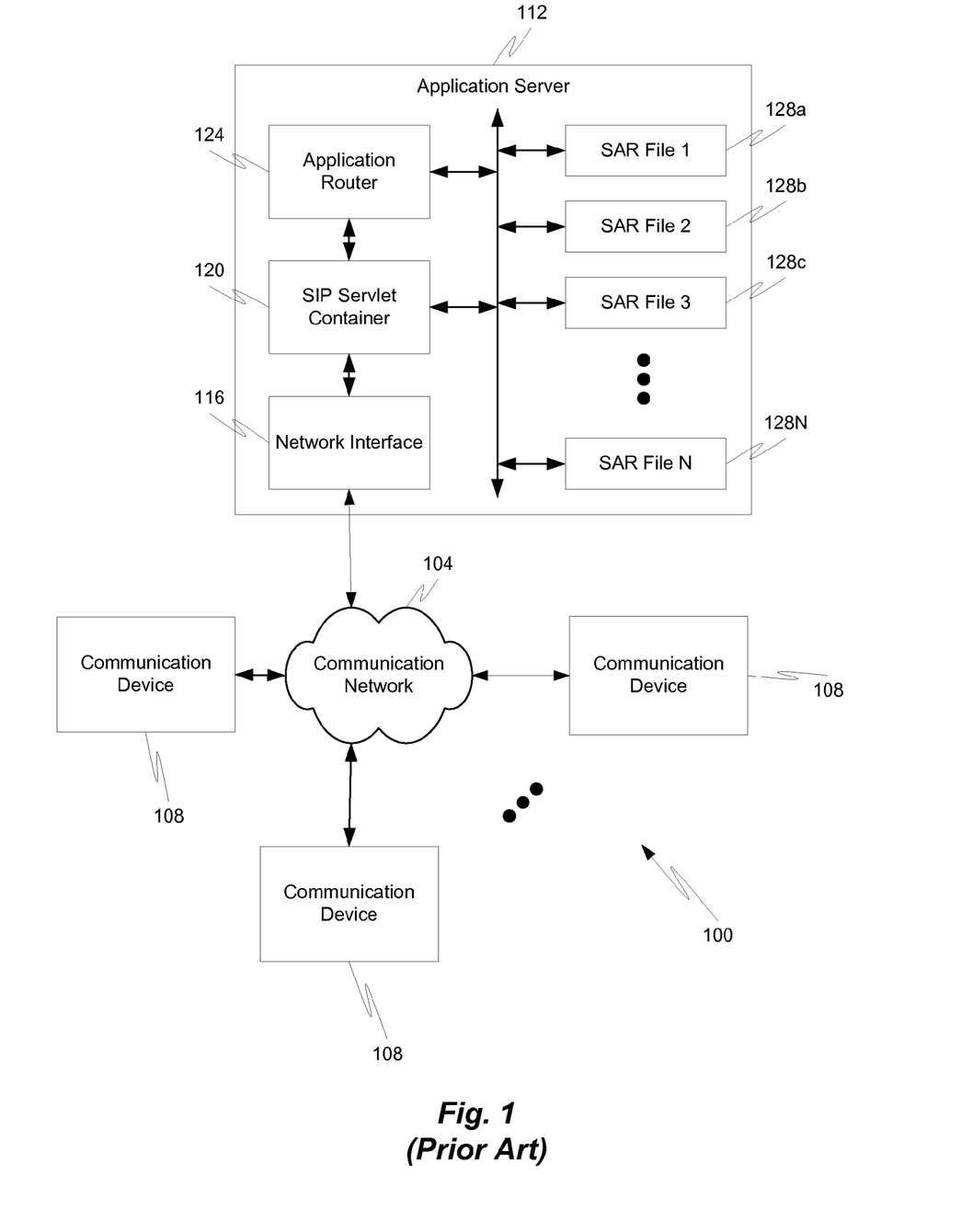
FIG. 1 is a block diagram depicting a communication system in accordance with embodiments of the prior art.

Such an architecture is depicted in FIG. 1, where a communication system 100 includes a number of communication devices 108 connected to an application server 112 via a communication network 104. As can be seen in FIG. 1, the application server 112 may comprise a network interface 116 that allows the application server 112 to receive incoming SIP messages from the communication network 104.

Messages received at the network interface 116 are passed to a SIP Servlet Container 120. The SIP Servlet Container 120 is responsible for handling initial message requests and passing such requests to the application router 124. The SIP Servlet Container 120 may also act as a Back-to-Back User Agent (B2BUA) or proxy. Once the message is passed to the application router 124, the application router 124 examines the SIP request and selects which application (i.e., SAR file 128a-N) needs to be executed to complete request processing. It should be noted that the application router generally does not modify any requests. Accordingly, the application router 124 identifies the appropriate SAR file 128, and informs the SIP Servlet Container 120 of its decision. The SIP Servlet Container 120 then invokes the appropriate servlet within the SAR (determined by mechanism described in JSR 289) and the request is processed in accordance with that servlet. Once a request has been adequately processed, the SIP Servlet Container 120 transfers the request back to the network interface 116 where it can be transferred to another device in the communication network 100 for further processing. This may include passing the request to another application server or passing the request to a user communication device 108.

There are two common approaches to co-host multiple applications in accordance with JSR 289. The first is to simply run multiple instances of the application server 112, where each server will host a single multi-SAR application. This may include virtualization technology to partition a single physical machine. The second approach is for the deployer to implement a custom application router to coordinate these applications on the same server.

While present commercial practice normally deploys multiple server instances to host individual multi-SAR applications as described above, the one application per server approach can impose additional hardware and administration costs. The second approach requires the deployer to understand and re-implement routing logic for each application that is to be hosted. This process is prone to errors and increases the development/deployment time. In addition, the complexity of the machine increases with the number of applications residing thereon.

SUMMARY

It is, therefore, one aspect of the present invention to introduce the concept of a root application router that will coordinate other sub-application routers rather than individual SARs. These other sub-application routers are fully fledged application routers in their own right but are unaware of the controlling root application router.

As used herein, a SAR is an application for performing a particular function or feature of an application, but an application usually comprises several SARs (e.g., a multi-SAR application). A SAR file, WAR file, EAR, or the like is responsible for containing a servlet which is used in connection with executing an operation on a SIP message or SIP request. The SAR/WAR file is the archive that contains the actual business/application logic and routing logic for executing a particular function.

A sub-application router implements the application router interface defined in JSR 289 and can be deployed within a JSR 289 compliant container on its own. However, in accordance with at least some embodiments of the present invention, these sub-application routers can be loaded and managed by the root application router and not the SIP Servlet Container.

The SIP Servlet Container may be provisioned to only be aware of the root application router. Incoming SIP messages received at the SIP Servlet Container would be passed to the root application router. The root application router would then delegate incoming SIP messages (according to a selection algorithm) to an instance of a sub-application router which will take responsibility for coordinating the subsequent processing of the SIP message, thereby making this solution appear as a single application router in accordance with JSR 289.

In accordance with at least some embodiments of the present invention, the routing rules defined on an application router basis (i.e., the rules used by the root application router to route messages to sub-application routers) are unimportant to the sub-application routers. Rather, this configuration will be the responsibility of the system deployer. An example is shown below:

```
<pattern>
  <or>
    <equal>
      <var>request.route.uri.user</var>
      <value>voicemail</value>
    </equal>
    <equal>
      <var>request.uri.user</var>
      <value>voicemail</value>
    </equal>
  </or>
</pattern>
```

This may be interpreted as: Send messages to this sub-application router if the route URI OR the request URI user portion matches the text "voicemail". Essentially this allows discriminating selection of sub-application routers based on message content. On receipt of a SIP message, the root application router will evaluate the rule sets in sequence. The order of evaluation is important and the deployer (usually the customer network administrator) has full control over this list. For example, a wildcard rule placed at the front means that applications behind it will never see any SIP messages. If a sub-application router does not specify any matching rules then it is assumed that it is a wild card and wants to process all messages.

In accordance with at least some embodiments of the present invention, a method is provided that generally comprises:

receiving a first message at a network interface of a first application server;

passing the first message to a root application router within the first application server;

determining, by the root application router, a sub-application router to receive and subsequently analyze the first message; and passing the first message to the sub-application router, wherein the sub-application router also resides within the first application server.

SIP servlets, in accordance with at least some embodiments of the present invention, are packaged into a self-contained jar file, such as a SAR file, WAR file, EAR file, or the like, that can be deployed and undeployed individually. A SIP servlet is very similar to other types of servlets in that they enhance the interface in which they are loaded to support SIP functions. An example of another type of servlet is an http servlet which is a Java application that runs in a web server or application server and provides server-side processing, typically to access a database or perform e-commerce processing. It is a Java-based replacement for CGI scripts, Active Server Pages (ASPs) and proprietary plug-ins written in C and C++. Servlets are similar to the CGI concept but, instead of using a separate process, messages are passed to a class that runs within a virtual machine inside the server.

Many servlets are written in a particular programming language (e.g., Java) which allows them to be portable between servers and operating systems. While Java is one example of a programming language that can be used to create a servlet, one skilled in the art will appreciate that embodiments of the present invention are not so limited. More specifically, embodiments of the present invention contemplate the creation of a servlet in any type of programming language which allows the SIP servlet to be portable between servers and/or operating systems. Embodiments of the present invention also contemplate a SIP servlet that is capable of running inside a virtual machine on a server (e.g., an enterprise server and particularly a SIP server).

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to allow a server to host multiple servlets.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 2:
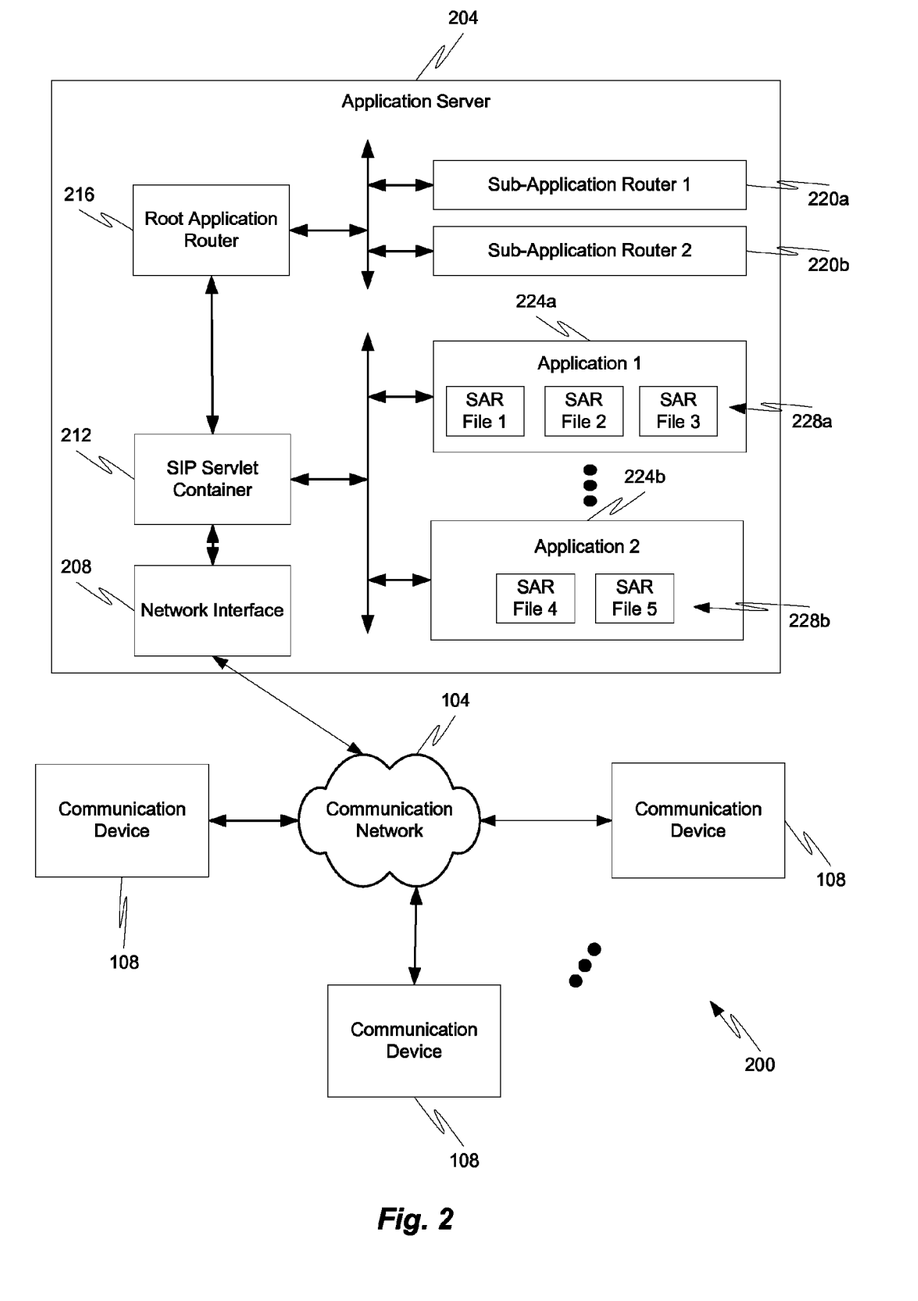
FIG. 2 is a block diagram depicting a communication system in accordance with at least some embodiments of the present invention.

With reference now to FIG. 2, an exemplary communication system 200 will be described in accordance with at least some embodiments of the present invention. More specifically, the communication system 200 includes a communication network 104 adapted to interconnect one or more communication devices 108 with an application server 204.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, any type of enterprise network, and any other type of packet-switched or circuit-switched network known in the art. In addition, it can be appreciated that the communication network 104 need not be limited to any one network type, and instead may be comprised of a number of different networks and/or network types.

The communication devices 108 may be any type of known communication or processing device such as a personal computer, laptop, Personal Digital Assistant (PDA), cellular phone, smart phone, telephone, analog phone, DCP phone, or combinations thereof. A single communication device 108 may be controlled by or be associated with a single user or may be adapted for use by many users (e.g., an enterprise communication device that allows any enterprise user to utilize the communication device upon presentation of a valid user name and password).

Each of the communication devices 108 may be associated with the same user. In other words, the communication devices 108 may belong to a single user and may correspond to different types of communication devices. As one example, the user may have four communication devices 108 each of which correspond to a personal phone, a work phone, a personal computer, and an email retrieval device, respectively, of a single user. Alternatively, each of the communication devices 108 may be owned and operated by (e.g., associated with) a different user.

In general, the communication device 108 may be adapted to support video, audio, text, and/or data communications with other communication devices 108. The type of medium used by the communication device 108 to communicate with other communication devices 108 may depend upon the communication applications available on the communication device 108.

In accordance with at least some embodiments of the present invention, one or more communication devices 108 may send a message, such as a SIP message, to the application server 204 where it is received at the server's network interface 208. The network interface 208 may include a communication port and/or network adaptor. As one example, the network interface 208 may comprise an Ethernet port and an Ethernet card/adaptor. As another example, the network interface 208 may comprise an antenna and an 802.11 or Bluetooth adaptor. Thus, as can be appreciated by those skilled in the art, the network interface 208 may support wired and/or wireless connections between the application server 204 and the communication network 104 and may further support multiple communication protocols.

The application server 204 may further comprise a SIP Servlet Container 212 for handling messages initially received at the application server 204. Additionally, the SIP SIP Servlet Container 212 may be responsible for transferring SIP requests to one or more applications 224 stored on the application server 204 where the requests can be processed in accordance with the functionality of the application 224.

Figure 3:
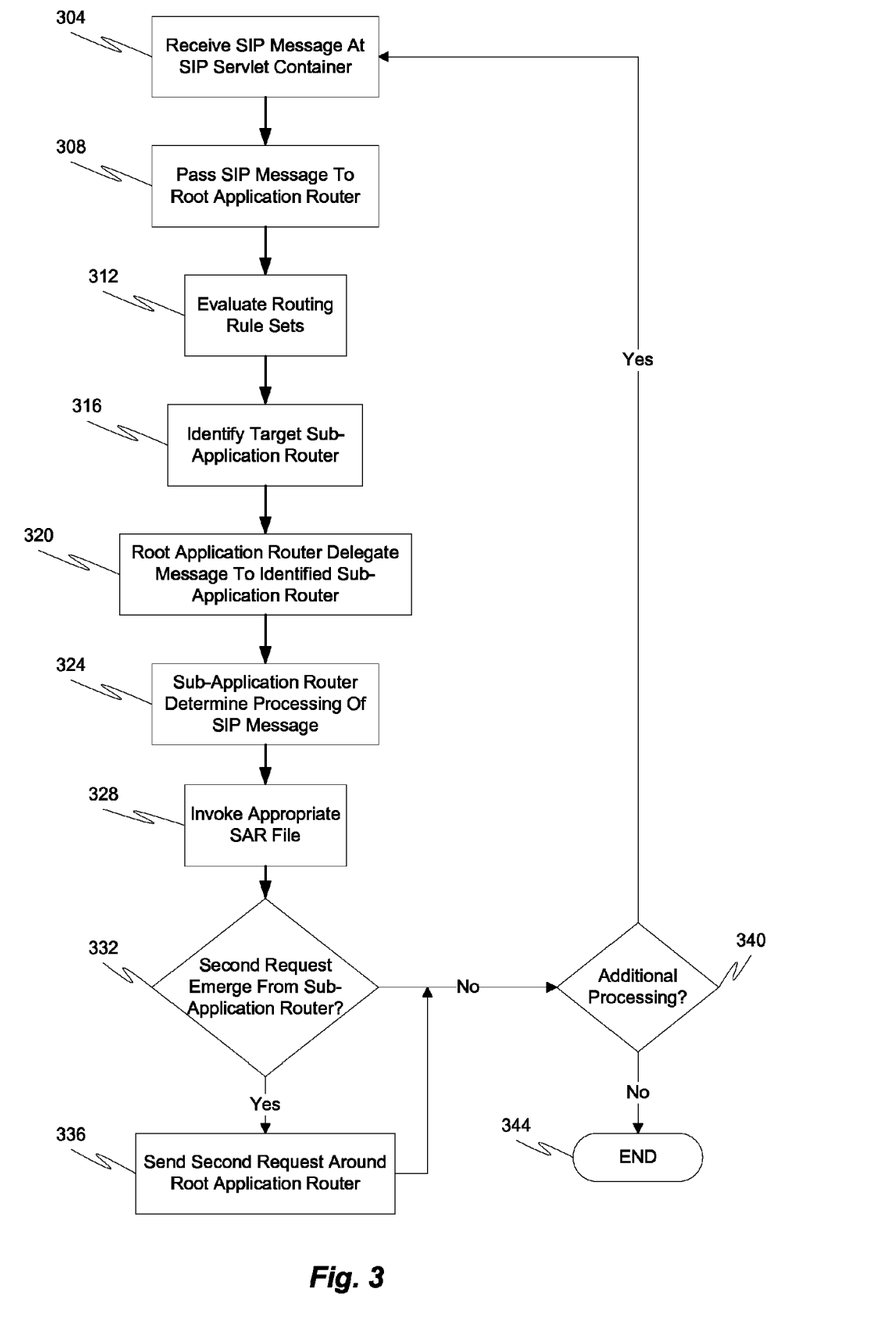
FIG. 3 is a flow diagram depicting a method of processing a SIP message in accordance with at least some embodiments of the present invention.

With reference now to FIGS. 2 and 3, messages received at the SIP Servlet Container 212 from the network interface 208 (step 304) may be passed to a root application router 216 (step 308). The root application router 216 may be responsible for coordinating the disbursement of SIP messages among the multiple sub-application routers 220 of the application server 204. More specifically, the root application router 216 may comprise the business rules or logic which define how a particular message or request should be routed among the sub-application routers 220 and may apply such rules (step 312) in identifying a target sub-application router 220 (step 316). Even more specifically, the root application router 216 may act as the hierarchical master or message gatekeeper for the sub-application routers 220. Thus, any message that is received at a sub-application router 220 is received via the root application router 216.

In accordance with at least some embodiments of the present invention, however, the sub-application routers 220 are unaware of the root application router 216 and any algorithms executed by the root application router 216. Instead, from the sub-application router's 220 perspective, the messages are received from the SIP Servlet Container 212, processed by the sub-application router 220, and sent back to the SIP Servlet Container 212, which is adapted to invoke the root application router 216 again to determine if there is another SAR 228 in the multi-SAR application 224 that should see the request. It should also be noted that a request can match rules for two or more sub-application routers 220a and 220b. In this circumstance, when the root application router 216 has determined that a request is to be routed to the sub-application routers 220a and 220b, the root application router 216 can pass the request to the first sub-application router 220a and once the corresponding first application 224a is done processing the message, the root application router 216 automatically passes the request on to the next sub-application router 220b.

When a sub-application router 220 receives a message (step 320) the sub-application router 220 analyzes the message to determine which application 224 will be responsible for actually processing the message (step 324). Accordingly, the sub-application router 220 does not actually process the message itself, but just analyzes information in the message to determine which application 224 will be used to process the message.

Upon making such a determination, the sub-application router 220 sends the message back to the SIP Servlet Container with an identification of the application 224 to process the message. The SIP Servlet Container 212 receives the message, analyzes the application identification, and forwards the message to the appropriate application 224. As can be seen in FIG. 2, the applications 224 may comprise two or more SAR files 228, each containing a servlet, such as a SIP servlet.

When a message is assigned to a particular application 224, the SIP Servlet Container 212 invokes the appropriate servlet within a SAR file 228 of the application 224 to actually process the message (step 328). As can be appreciated by those skilled in the art, although the applications 224 are depicted as comprising three and two SAR files 228a, 228b, respectively, an application 224 may comprise a greater or lesser number of SAR files 228 depending upon the function of the application 224. For example, an application 224 may comprise one, two, three, four, or more SAR files 228 without departing from the scope of the present invention. An application 224 comprising two or more SAR files 228 is referred to herein as a multi-SAR application 224. Embodiments of the present invention provide the ability to co-host a plurality of multi-SAR applications 224 on a common server 204, particularly through the use of a root application router 216.

In accordance with at least some embodiments of the present invention, an application 224 provides a general functionality or feature for a SIP message. The SAR file(s) 228 contained within an application 224 contain the servlets which are the processes that execute the steps needed to provide the function of the application 224. As one example, an application 224 may correspond to a voicemail function. The SAR files 228 within the voicemail application 224 may contain servlets which execute processes such as determining that a call should go to voicemail coverage, identifying a location of an appropriate voicemail server, transferring the call to the voicemail server, providing IVR functions to the caller, recording a message from the caller, and storing the message in the voicemail server. Of course, some of the voicemail processes described above may be executed as separate SAR files on other applications 224. Furthermore, voicemail is but one example of an exemplary function provided by an application 224. Other types of functions provided by an application 224 include, but are not limited to, a call forwarding function, a call routing function, a coverage function, a recording function, a call setup function, a blacklist function, a whitelist function, an incoming call notification function, an end call function, and a bill customer function. Other functions made available via an application 224 will become apparent to those skilled in the art and are also considered within the scope of the present invention.

When a message is being processed by a servlet within a SAR file 228, the servlet may generate a second message or SIP request (e.g., a call transfer message in the voicemail application example described above). Thus, in step 332 it is determined whether or not a new request or message has been generated by the servlet due to its processing of the initially received message. If this inquiry is answered affirmatively, then the message is transferred back to the SIP Servlet Container 212 where it can be forwarded to another computational component, which may or may not reside in the application server 204 (step 336). If such a message is generated by the servlet, the second SIP message is sent to a computational component without causing the second message to be evaluated by the root application router 216.

Once the application 224 has invoked all of its servlets within the SAR files 228 and the message has been processed by those servlets or if the inquiry of step 332 is answered negatively, the method continues by determining if there is additional processing required for the first message (step 340). If the message requires additional processing, possibly by another application 224, then the method returns to step 304 and the message is forwarded to the SIP Servlet Container 212 which subsequently provides the message back to the root application router 216. If no additional processing is required, then the method ends (step 344). Of course, as a part of completing the message processing, the message may be transferred out of the application server 204 via the network interface 208.

As can be appreciated by those skilled in the art, although the application server 204 depicted in FIG. 2 contains two sub-application routers 220a, 220b, an application server 204 may comprise a greater or lesser number of sub-application routers 220 in accordance with embodiments of the present invention.

Likewise, although the application server 204 is depicted as having only two applications 224a, 224b, an application server 204 may comprise a greater or lesser number of applications 224 in accordance with embodiments of the present invention. Furthermore, the number of sub-application routers 220 does not, and usually will not, match the number of applications 224 in the application server 204. Accordingly, a single sub-application router 220 may be adapted to make a message routing decision between a plurality of applications 228. In other words, a sub-application router 220 may be adapted to determine whether a message should be sent to a first, second, third, fourth, etc. application 224 for processing and may make different decisions for different messages received at the sub-application router 220. Furthermore, two sub-application routers 220 may be adapted to route a message to a common application 224 (i.e., sub-application routers 220 may share an application 224), although such an embodiment will depend on a number of other considerations.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for co-hosting SIP servlet applications on a server. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving a first message at a network interface of a first application server wherein the first message comprises a Session Initiation Protocol (SIP) message;
passing the first message to a root application router within the first application server;
determining, by the root application router, a sub-application router to receive and subsequently analyze the first message;
passing the first message to the sub-application router, wherein the sub-application router also resides within the first application server;
wherein the first application server comprises two or more applications, each application having one or more servlets, the method further comprising:
determining, by the sub-application router, which application among the two or more applications should process the first message;
sending results of the determination made by the sub-application router to a SIP Servlet Container in the first application server;
forwarding, by the SIP Servlet Container, the first message to the determined application among the two or more applications;
receiving, at the network interface, a second message, wherein the first and second messages are different;
passing the second message to the root application router;
determining, by the root application router, a second sub-application router to receive and subsequently analyze the second message, wherein the second sub-application router determined to receive the second message is not the sub-application router determined to receive the first message;
passing the second message to the second sub-application router, wherein the second sub-application router also resides within the first application server;
determining, by the second sub-application router, which application among the two or more applications should process the second message;
sending results of the determination made by the second sub-application router to the SIP Servlet Container; and
forwarding, by the SIP Servlet Container, the second message to the determined application among the two or more applications.

2. The method of claim 1, further comprising:
processing, by the determined application, the first message with two or more servlets, wherein the determined application provides a particular function and each of the two or more servlets execute an operation on the first message in accordance with the particular function of the determined application.

3. The method of claim 2, wherein the particular function comprises one or more of a voicemail function, a call forwarding function, a call routing function, a coverage function, a recording function, a call setup function, a blacklist function, a whitelist function, an incoming call notification function, an end call function, and a bill customer function.

4. The method of claim 2, further comprising:
generating, by one of the two or more servlets, a second SIP message, wherein the second SIP message is generated during processing of the first message;
sending the second SIP message to the SIP Servlet Container; and
forwarding, by the SIP Servlet Container, the second SIP message to a computational component without causing the second SIP message to be evaluated by the root application router.

5. The method of claim 4, wherein the computational component does not reside in the first application server.

6. A server, comprising:
a root application router;
a plurality of sub-application routers in communication with the root application router, the root application router adapted to distribute messages among the plurality of sub-application routers;
a plurality of applications, wherein each sub-application router is adapted to receive a message from the root application router and determine an application from among the plurality of applications which will be used to process the message, wherein the plurality of applications comprises two or more servlets and wherein the message comprises a Session Initiation Protocol (SIP) message;
a SIP Servlet Container, wherein each of the sub-application routers are adapted to send results of its determination of the application to process the message to the SIP Servlet Container and wherein the SIP Servlet Container is adapted to forward the message to the determined application to process the message; and
wherein each application is adapted to process messages with a servlet, wherein each application provides a particular function and the servlets execute an operation on the message in accordance with the particular function of the determined application.

7. The server of claim 6, wherein the particular function comprises one or more of a voicemail function, a call forwarding function, a call routing function, a coverage function, a recording function, a call setup function, a blacklist function, a whitelist function, an incoming call notification function, an end call function, and a bill customer function.

8. The server of claim 6, wherein a servlet is adapted to generate a second subsequent message as a result of processing a first message, wherein servlet is adapted to send the second message to the SIP Servlet Container for forwarding to a computational component without causing the second SIP message to be evaluated by the root application router.

9. The server of claim 8, wherein the computational component does not reside in the server.

10. A non-transitory computer readable information storage medium having stored thereon computer executable instructions that, when executed by a processor, cause the processor to execute a method comprising:
receiving a first message at a network interface of a first application server wherein the first message comprises a Session Initiation Protocol (SIP) message;
passing the first message to a root application router within the first application server;
determining, by the root application router, a sub-application router to receive and subsequently analyze the first message;
passing the first message to the sub-application router, wherein the sub-application router also resides within the first application server;
wherein the first application server comprises two or more applications, each application having one or more servlets, the method further comprising:
determining, by the sub-application router, which application among the two or more applications should process the first message;
sending results of the determination made by the sub-application router to a SIP Servlet Container in the first application server;
forwarding, by the SIP Servlet Container, the first message to the determined application among the two or more applications;
receiving, at the network interface, a second message, wherein the first and second messages are different;
passing the second message to the root application router;
determining, by the root application router, a second sub-application router to receive and subsequently analyze the second message, wherein the second sub-application router determined to receive the second message is not the sub-application router determined to receive the first message;
passing the second message to the second sub-application router, wherein the second sub-application router also resides within the first application server;
determining, by the second sub-application router, which application among the two or more applications should process the second message;
sending results of the determination made by the second sub-application router to the SIP Servlet Container; and
forwarding, by the SIP Servlet Container, the second message to the determined application among the two or more applications.

11. The non-transitory computer readable information storage medium of claim 10, wherein the determined application comprises two or more servlets contained in two or more wrapper files, each of the two or more servlets being used to process the first message, wherein the determined application provides a particular function and each of the two or more servlets execute an operation on the first message in accordance with the particular function of the determined application, and wherein the particular function comprises one or more of a voicemail function, a call forwarding function, a call routing function, a coverage function, a recording function, a call setup function, a blacklist function, a whitelist function, an incoming call notification function, an end call function, and a bill customer function.

* * * * *